United States Patent [19]
Aubuchon et al.

[11] Patent Number: 5,825,612
[45] Date of Patent: Oct. 20, 1998

[54] LAP-SUPPORTABLE REMOTE INFRARED COMPUTER KEYBOARD

[75] Inventors: Mark S. Aubuchon; Jeffrey T. Lininger, both of Spring; Meera K. Manahan, Tomball, all of Tex.

[73] Assignee: Compaq Computer Corporation, Houston, Tex.

[21] Appl. No.: 829,165

[22] Filed: Mar. 31, 1997

[51] Int. Cl.[6] ................................................ G06F 1/16
[52] U.S. Cl. ................... 361/680; D14/115; 400/715; 400/472; 345/168
[58] Field of Search ................. 364/708.1; 224/267, 224/222; D14/115; 108/43; 400/472, 475, 489, 691, 693, 694, 715; 341/22; 345/157, 160, 167–169, 905; 361/680, 683

[56] References Cited

U.S. PATENT DOCUMENTS

| | | | |
|---|---|---|---|
| D. 346,796 | 5/1994 | Pangburn | D14/115 |
| D. 371,774 | 7/1996 | Wang | D14/115 |
| 5,029,260 | 7/1991 | Rollason | 400/489 X |
| 5,143,341 | 9/1992 | Juster | 248/444 |
| 5,307,297 | 4/1994 | Iguchi et al. | 364/708.1 |
| 5,404,267 | 4/1995 | Silva et al. | 361/683 |
| 5,675,360 | 10/1997 | Takegoshi et al. | 345/167 |

*Primary Examiner*—Michael W. Phillips
*Attorney, Agent, or Firm*—Konneker & Smith

[57] ABSTRACT

The elongated body portion of a lap-supportable remote infrared computer keyboard is contoured on its bottom side, by means of a spaced pair of arcuately shaped, generally parallel recesses that extend between front and rear sides of the body, to conform to upper side portions of a seated user's thighs. Positioned in the recesses are spaced series of elongated outwardly projecting parallel ribs which longitudinally extend transversely to the lengths of the recesses and serve to frictionally inhibit front-to-rear shifting of the lap-supported keyboard along the user's thighs. The key member portions of the keyboard are positioned on the top side of the body between left and right end portions thereof. On the top side of one of these end portions is a pointing device, representatively a track ball, and on the top side of the other end portion are a pair of selection buttons. This end-to-end separation of the pointing device and selection buttons permits the user to operate them while holding an end of the keyboard body in each hand, thereby substantially preventing the use of either the track ball or the selection buttons from tending to tip the keyboard either leftwardly or rightwardly on the user's lap.

34 Claims, 2 Drawing Sheets

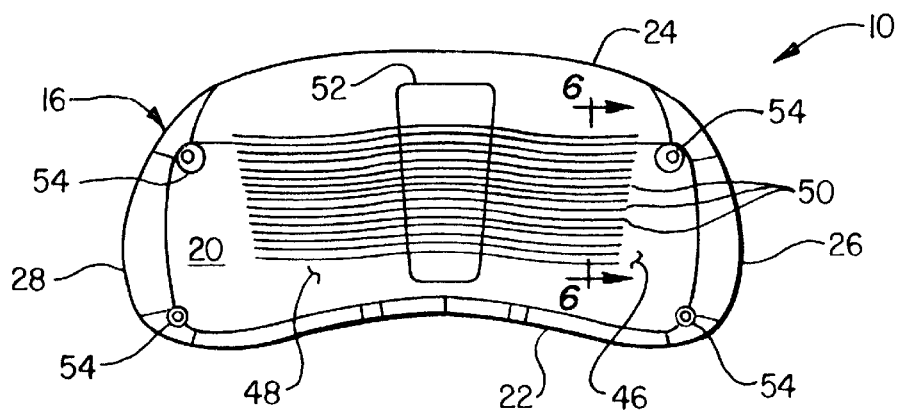
FIG. 5
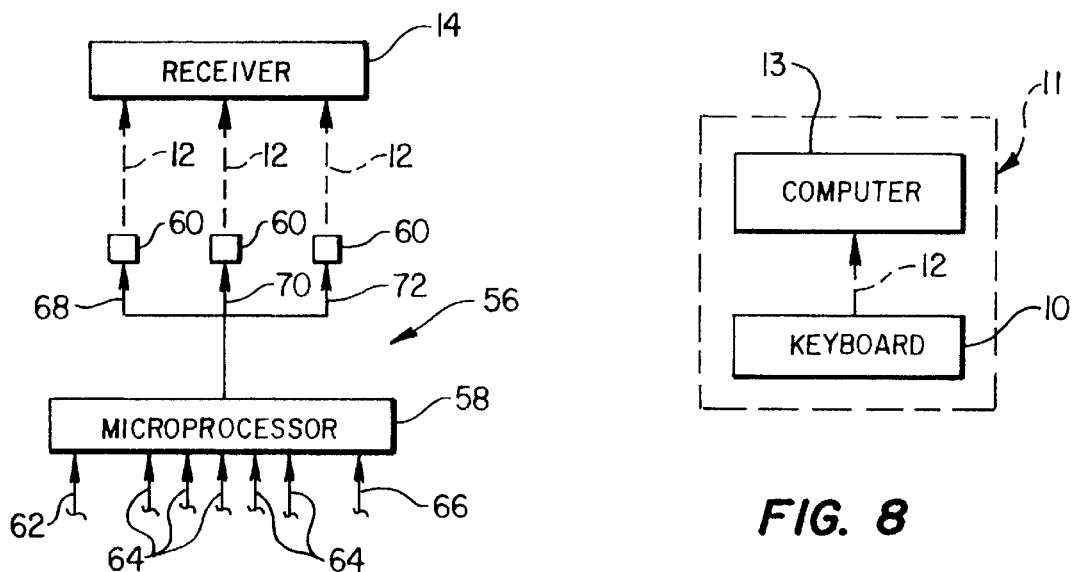
FIG. 7
FIG. 8
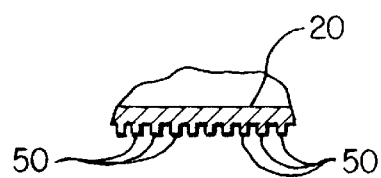
FIG. 6

LAP-SUPPORTABLE REMOTE INFRARED COMPUTER KEYBOARD

BACKGROUND OF THE INVENTION

1. Field of the Invention

The present invention generally relates to computer apparatus and, in a preferred embodiment thereof, more particularly relates to a specially designed remote infrared keyboard structure contoured for laptop use and having incorporated therein ergonomically improved cursor positioning apparatus.

2. Description of Related Art

A fairly recent development in the computer art is the use of a television-based computer system in which a television is used as the monitor portion of the system, and a remote infrared keyboard is used to control the system. This permits the user of the system to be comfortably seated a sometimes considerable distance from the screen (as when the user is watching a TV program thereon) with the keyboard on his lap. The normal cursor positioning and computer operation selection tasks are handled by means of a pointing device and selection buttons built into the remote keyboard.

As typically provided in this type of TV-based computer system, the remote keyboard portion of the system has simply been a generally conventionally configured desktop keyboard with infrared signal generating circuitry built into it to convert the pointing device, selection button and key input signals into appropriately coded infrared beams transmitted to an infrared received connected into the remote computer and display circuitry.

Various problems, limitations and disadvantages have been encountered in the design task of converting a desktop computer type keyboard into an infrared remote lap-supportable keyboard unit for a TV-based computer system.

For example, when a keyboard of the type normally placed on a desktop, and hard-wired to its associated adjacent computer, is moved away from the desktop and placed on the lap of a user, the keyboard configuration so well suited to the planar desktop tends to make the relocated keyboard an awkward, tippy and somewhat uncomfortable accessory when perched on the uneven and sometimes shifting surface of a user's lap.

Additionally, the keyboard pointing device (for example, a track ball) and its associated selection buttons are typically positioned on a desktop computer keyboard in a manner such that, when the keyboard is held on a user's lap, their use tends to create a force imbalance on the keyboard which tends to increase the keyboard's propensity to tip and fall off or shift around on the user's lap.

It has also been observed that in remote keyboard applications such as in a TV-based computer system many users, while holding the keyboard, sometimes like to walk around the room (instead of sitting) and use the integral pointing device and associated selection or "click" buttons on the keyboard. Due to the placement of the pointing/click button portions on conventionally configured desktop computer keyboards, as mentioned above the use of these keyboard portions tends to be somewhat awkward even when the user is seated. When the underlying bracing force of the user's lap is removed from the keyboard, and only the user's hands support the keyboard, this task becomes even more awkward in most instances.

From the foregoing it can readily be seen that it would be highly desirable to provide an improved lap supportable remote keyboard which eliminates or at least substantially reduces the above-mentioned problems, limitations and disadvantages typically associated with conventionally configured remote keyboards of the type generally described above.

SUMMARY OF THE INVENTION

In carrying out principles of the present invention, in accordance with a preferred embodiment thereof, a lap-supportable keyboard is provided which is representatively incorporated in a television-based computer system and has improved stability and operating ease. The keyboard is representatively a remote infrared computer keyboard and comprises a body portion having a center, top and bottom sides, opposite front and rear sides spaced apart in a first direction, and opposite first and second end portions spaced apart in a second direction transverse to the first direction. A series of manually depressible keys are operatively supported on the top side of the body portion.

According to one feature of the present invention, a recessed area is formed in the bottom side of the body portion and is configured to receive top side portions of a seated user's thighs in a manner stabilizing the keyboard thereon. Representatively, the recess area is defined by a pair of generally parallel recesses formed in the bottom side of the body portion, extending in the first direction, and spaced apart in the second direction.

To further stabilize the keyboard on the user's lap the keyboard preferably further comprises a structure carried on top side portions of the recesses and operative to frictionally inhibit front-to-rear shifting of the keyboard along upper side portions of the user's thighs received in the recesses. Representatively, this structure includes series of mutually spaced parallel ribs longitudinally extending in the second direction along the surfaces of the recesses.

According to another feature of the invention, the keyboard is provided with a pointing device, representatively a track ball, and a selection device representatively including a pair of selection buttons. The pointing device is carried on the body portion and spaced apart a first distance from the body portion center in the second direction toward the first end of the body portion. The selection device is carried on the body portion and spaced apart a second distance from the body portion center in the second direction toward the second end of the body portion. Representatively, the second distance is at least approximately equal to the first distance.

Preferably, the pointing and selection devices are carried on top sides of the first and second body end portions and are forwardly offset at least approximately equal distances from the body portion center. The pointing and selection devices are positioned to be operated by the opposite hands of the user while they grasp the opposite first and second body end portions. By virtue of this symmetrically spaced apart positioning of the pointing and selection devices, the user operating forces exerted on the devices are also symmetrically oriented relative to the keyboard body. This substantially reduces end-for-end tipping forces exerted on the keyboard, thereby further stabilizing it on the user's lap. The useable positioning of the pointing and selection devices on the manually graspable opposite keyboard body end portions also permits the user to stand, and walk around the room, while securely and comfortably holding the keyboard and operating its pointing and selection devices.

In a preferred embodiment thereof, the keyboard also includes electronic circuitry which is carried by the body portion and is operative to receive input signals from the keys, the pointing device, and the selection device and responsively output corresponding remotely receivable infrared signals. The electronic circuitry representatively includes a microprocessor operative to receive the input signals from the keys, pointing device and selection device and responsively output corresponding infrared protocol signals, and light emitting diodes operative to receive the protocol signals and responsively generate the corresponding remotely receivable infrared signals.

BRIEF DESCRIPTION OF THE DRAWINGS

FIG. 5 is a bottom plan view of the keyboard;

FIG. 6 is an enlarged scale partial cross-sectional view through the keyboard taken along line 6—6 of FIG. 5;

FIG. 7 is a highly schematic diagram of a portion of the electronic circuitry in the keyboard; and FIG. 8 is a highly schematic block diagram of a representative computer system incorporating the keyboard therein.

DETAILED DESCRIPTION

Figure 1:
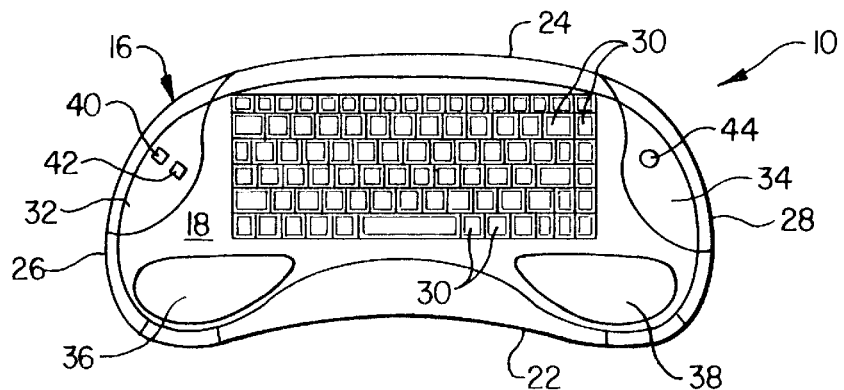
FIG. 1 is a top plan view of a specially designed remote infrared keyboard embodying principles of the present invention.

The present invention provides a specially designed lap-supportable remote infrared computer keyboard 10 which is illustrated in FIGS. 1–5 and may be used to control a television-based or other type of computer system 11 (see FIG. 8) by transmitting infrared signals 12 (see FIG. 7) to a signal receiver portion 14 of the computer part 13 of the system 11. Keyboard 10 has a specially configured, relatively thin and generally rectangularly shaped body portion 16 having top and bottom sides 18 and 20; opposite front and rear sides 22 and 24; and opposite left and right end portions 26 and 28.

A generally rectangular array of manually depressible keys 30 are operatively disposed on the top side 18 of the body 16, centrally disposed between the left and right end portions 26,28 and rearwardly shifted relative to the center of the keyboard as viewed in FIG. 1. As depicted, left and right end portions 26 and 28 are smoothly rounded, but could be squared off if desired to thereby give the keyboard body 16 a more purely rectangular shape as viewed from its top side.

Top side areas 32,34 of the left and right body end portions 26 and 28 (see FIG. 1), respectively, are externally covered with a suitable elastomeric material, such as neoprene, as are left and right top side palm rest areas 36,38 positioned at front corners of the body portion 16 as viewed in FIG. 1. Mounted on the top side 18 of the body 16, within the area 32, is a selection device that includes a pair of computer mouse-type selection buttons 40 and 42. Also mounted on the top side 18 of the body 16, within the area 34, is a pointing device representatively in the form of a track ball 44.

The keyboard 10, as previously mentioned herein, is designed to be supported on a seated user's lap. To facilitate the use the keyboard in this operating orientation, the present invention provides a recessed area in the bottom side 20 of the keyboard body 16 which is configured to receive top side portions of a seated user's thighs in a manner stabilizing the keyboard 10 thereon. As can best be seen in FIGS. 2, 3 and 5, in the illustrated preferred embodiment of the keyboard this recessed area is defined by a pair of arcuate bottom side recesses 46 and 48.

Figure 2:
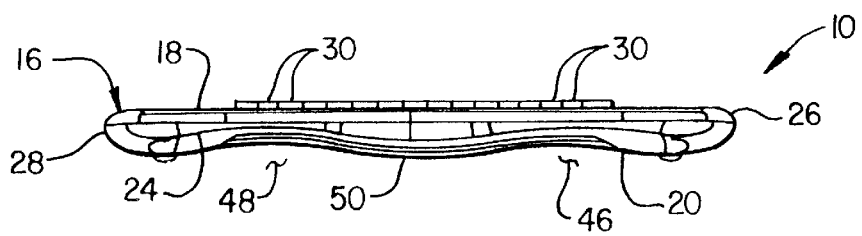
FIG. 2 is a rear side elevational view of the keyboard.
Figure 3:
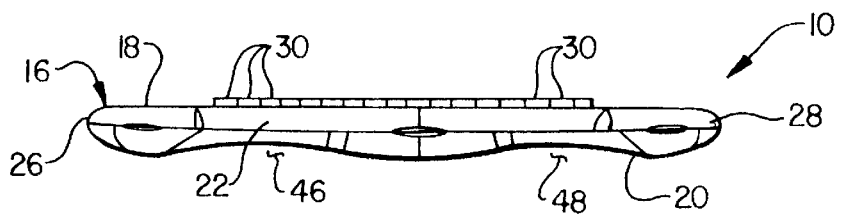
FIG. 3 is a front side elevational view of the keyboard.
Figure 4:
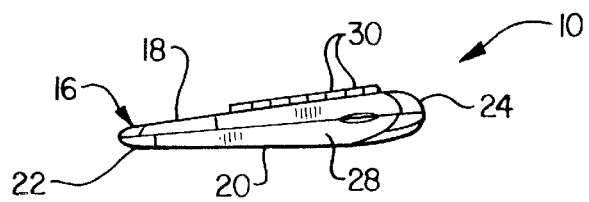
FIG. 4 is a right end elevational view of the keyboard.

These generally parallel bottom side recesses 46 and 48 are spaced apart in a left-to-right direction on opposite sides of the center of the body 16 as viewed in FIGS. 2, 3 and 5, extend in front-to-rear directions, and are contoured to upwardly receive top side portions of the seated user's thighs to thereby inhibit end-to-end shifting of the keyboard 10 on the user's lap. Front-to-rear shifting of the keyboard 10 on the user's lap is inhibited by a frictional structure disposed on the surfaces of the recesses 46 and 48.

This frictional structure is representatively in the form of a spaced series of elongated parallel ribs 50 (see FIGS. 2, 5 and 6) which project downwardly from the bottom side 20 of the keyboard body 16 and longitudinally extend in left-to-right directions across the top side surfaces of the recesses 46 and 48. Ribs 50 are preferably formed integrally with the bottom body portion side 20 as indicated in FIG. 6. As best illustrated in FIG. 5, the ribs 50 extend across and are also formed on the bottom side of a removable bottom side access door 52 which covers a battery compartment (not shown) in which the batteries that power the internal keyboard electronic circuitry subsequently described herein.

As can be seen, the bottom side recesses 46 and 48, coupled with the ribs 50, serve to stabilize the keyboard 10 on the user's lap against both end-to-end displacement and front-to-rear shifting. In addition to this stabilization, the lap-supported keyboard 10 is further stabilized by the unique placement of the pointing device 44 and its associated selection buttons 40,42 as will now be described.

Referring now to FIG. 1, it can be seen that the selection buttons 40,42 are leftwardly offset relative to the center of the keyboard body a distance which is at least approximately equal to the distance which the track ball 44 is rightwardly offset from the body center. This endwise separation of the track ball 44 and its associated selection buttons 40,42 results in a substantially symmetrical downward force pattern being exerted on the keyboard body 16 as the user operates the track ball and selection buttons with his opposite hands. This, in turn, inhibits undesirable tipping of the keyboard body on the user's lap as might easily occur if the track ball were conventionally grouped together in an off-center location on the body.

The opposite end portions 26 and 28 of the keyboard body 16 are configured to be conveniently grasped in the opposite hands of the user while he operates the track ball 44 and its associated selection buttons 40 and 42. This advantageously permits to stand and walk around the room while securely and comfortably holding the remote infrared keyboard 10.

While the keyboard 10 is particularly well suited to lap-supported remote control use, it may also be used in a conventional near-computer desktop location. The placement of the keyboard 10 on a desktop or other horizontal work surface is facilitated by the provision of suitable support foot members 54 on the bottom side 20 of the keyboard body 16 as indicated in FIG. 5.

Turning now to FIG. 7, generally conventional battery-powered electronic circuitry 56 is suitably disposed within the interior of the keyboard body 16 and is operative to transmit the previously mentioned infrared signals 12 to the system receiver 14 in response to the use of the keys 30, the selection buttons 40,42 and the track ball 44. Representatively, the electronic circuitry 56 includes a pre-programmed microprocessor 58 and three light emitting diodes (LED's) 60. In respective response to receiving input signals 62,64,66 from the selection buttons 40 and 42, the keys 30, and the track ball 44, the microprocessor 58 transmits appropriate infrared protocol signals 68,70,72 to the LED's 60 which, in turn, transmit the indicated infrared signals 12 to the system receiver 14.

The foregoing detailed description is to be clearly understood as being given by way of illustration and example only, the spirit and scope of the present invention being limited solely by the appended claims.

What is claimed is:

1. Keyboard apparatus supportable on a seated user's lap, comprising:
   a body portion having top and bottom sides, opposite front and rear sides spaced apart in a first direction, and opposite first and second ends spaced apart in a second direction transverse to said first direction;
   a series of manually depressible keys supported on said top side;
   a pair of generally parallel recesses formed in said bottom side, extending in said first direction and spaced apart in said second direction, said recesses having top side surfaces and being configured to receive top side portions of a seated user's thighs; and
   series of mutually spaced parallel ribs longitudinally extending in said second direction along said top surfaces of said recesses in contiguous relationships therewith, said series of parallel ribs being operative to frictionally inhibit front-to-rear shifting of said keyboard apparatus along upper side portions of a user's thighs received in said recesses.

2. The keyboard apparatus of claim 1 wherein said keyboard apparatus is a computer keyboard.

3. The keyboard apparatus of claim 2 wherein said computer keyboard is a remote infrared computer keyboard.

4. The keyboard apparatus of claim 1 wherein said parallel ribs are formed integrally with said bottom side of said body portion.

5. The keyboard apparatus of claim 1 wherein said opposite first and second ends have rounded configurations.

6. Keyboard apparatus supportable on a seated user's lap, comprising:
   a body portion having a center, top and bottom sides, opposite front and rear sides spaced apart in a first direction, and first and second end portions spaced apart in a second direction transverse to said first direction;
   a series of manually depressible keys supported on said top side, said first and second end portions being positioned outwardly of said series of manually depressible keys in said second direction;
   a pointing device carried on said first end portion; and
   a selection device carried on said second end portion.

7. The keyboard apparatus of claim 6 wherein said keyboard apparatus is a computer keyboard.

8. The keyboard apparatus of claim 6 wherein said pointing device and said selection device are spaced apart from said center at least approximately equal distances in said first direction.

9. The keyboard apparatus of claim 8 wherein said pointing device and said selection device are rearwardly offset from said center.

10. Keyboard apparatus comprising:
    a body portion having a top side, a length, and opposite first and second end portions spaced apart along said length and being graspable in the hands of a user of the keyboard apparatus;
    a series of manually depressible keys supported on said top side and being inset lengthwise from said first and second end portions;
    a pointing device carried on said first end portion and operable by the user's hand grasping said first end portion; and
    a selection device carried on said second end portion and operable by the user's hand grasping said second end portion.

11. The keyboard apparatus of claim 10 wherein said keyboard apparatus is a computer keyboard.

12. The keyboard apparatus of claim 11 wherein said computer keyboard is a remote infrared computer keyboard.

13. The keyboard apparatus of claim 10 wherein said pointing device is a track ball.

14. The keyboard apparatus of claim 10 wherein said selection device includes a pair of selection buttons.

15. The keyboard apparatus of claim 10 wherein said pointing device is carried on the top side of said first end portion.

16. The keyboard apparatus of claim 10 wherein said selection device is carried on the top side of said second end portion.

17. Remote infrared computer keyboard apparatus comprising:
    a body portion having top and bottom sides, opposite front and rear sides spaced apart in a first direction, and opposite first and second end portions spaced apart in a second direction transverse to said first direction and graspable in the hands of a user of the keyboard apparatus;
    a series of manually depressible keys supported on said top side and inset in said second direction from said first and second end portions;
    a pointing device carried on said first end portion and operable by the user's hand grasping said first end portion;
    a selection device carried on said second end portion and operable by the user's hand grasping said second end portion;
    a pair of generally parallel recesses formed in said bottom side, extending in said first direction and spaced apart in said second direction, and configured to receive top side portions of a seated user's thighs; and
    electronic circuitry carried by said body portion and operative to receive input signals from said keys, said pointing device, and said selection device and responsively output corresponding remotely receivable infrared signals.

18. The remote infrared computer keyboard apparatus of claim 17 wherein said recesses are defined by arcuate portions of said bottom side of said body portion.

19. The remote infrared computer keyboard apparatus of claim 17 further comprising a structure carried on top side portions of said recesses and operative to frictionally inhibit front-to-rear shifting of said keyboard apparatus along upper side portions of a user's thighs received in said recesses.

20. The remote infrared computer keyboard apparatus of claim 19 wherein said structure includes a rib structure projecting outwardly from the surfaces of said recesses.

21. The remote infrared computer keyboard apparatus of claim 20 wherein said rib structure includes series of mutually spaced parallel ribs longitudinally extending in said second direction along said surfaces of said recesses.

22. The remote infrared computer keyboard apparatus of claim 21 wherein said parallel ribs are formed integrally with said bottom side of said body portion.

23. The remote infrared computer keyboard apparatus of claim 17 wherein said opposite first and second end portions have rounded configurations.

24. The remote infrared computer keyboard apparatus of claim 17 wherein said pointing device is a track ball.

25. The remote infrared computer keyboard apparatus of claim 17 wherein said selection device includes a pair of selection buttons.

26. The remote infrared computer keyboard apparatus of claim 17 wherein said pointing device is carried on the top side of said first end portion.

27. The remote infrared computer keyboard apparatus of claim 17 wherein said selection device is carried on the top side of said second end portion.

28. The remote infrared computer keyboard apparatus of claim 17 wherein:

said pointing device is carried on a top side area of said first end portion, said selection device is carried on a top side area of said second end portion, and said body portion has a pair of top side palm rest areas disposed thereon forwardly of said top side areas of said first and second end portions.

29. The remote infrared computer keyboard apparatus of claim 28 wherein said top side areas of said first and second end portions and said top side palm rest areas have elastomeric outer side sections.

30. The remote infrared computer keyboard apparatus of claim 17 wherein said electronic circuitry includes:

a microprocessor operative to receive said input signals from said keys, said pointing device, and said selection device and responsively output corresponding infrared protocol signals, and light emitting diodes operative to receive said protocol signals and responsively generate said corresponding remotely receivable infrared signals.

31. A computer system comprising a computer and a keyboard apparatus supportable on a seated user's lap and useable to transmit operating signals to said computer, said keyboard apparatus comprising:

a body portion having top and bottom sides, opposite front and rear sides spaced apart in a first direction, and opposite first and second ends spaced apart in a second direction transverse to said first direction;

a series of manually depressible keys supported on said top side;

a pair of generally parallel recesses formed in said bottom side, extending in said first direction and spaced apart in said second direction, said recesses having top side surfaces and being configured to receive top side portions of a seated user's thighs; and series of mutually spaced parallel ribs longitudinally extending in said second direction along said top side surfaces of said recesses in contiguous relationships therewith, said series of parallel ribs being operative to frictionally inhibit front-to-rear shifting of said keyboard apparatus along upper side portions of a user's thighs received in said recesses.

32. A computer system comprising a computer and a keyboard apparatus supportable on a seated user's lap and useable to transmit operating signals to said computer, said keyboard apparatus comprising:

a body portion having a center, top and bottom sides, opposite front and rear sides spaced apart in a first direction, and first and second end portions spaced apart in a second direction transverse to said first direction;

a series of manually depressible keys supported on said top side, said first and second end portions being positioned outwardly of said series of manually depressible keys in said second direction;

a pointing device carried on said first end portion; and a selection device carried on said second end portion.

33. A computer system comprising a computer and a keyboard apparatus useable to transmit operating signals to said computer, said keyboard apparatus comprising:

a body portion having a top side, a length, and opposite first and second end portions spaced apart along said length and being graspable in the hands of a user of the keyboard apparatus;

a series of manually depressible keys supported on said top side and being inset lengthwise from said first and second end portions;

a pointing device carried on said first end portion and operable by the user's hand grasping said first end portion; and a selection device carried on said second end portion and operable by the user's hand grasping said second end portion.

34. A computer system comprising a computer and a remote infrared keyboard apparatus useable to transmit operating signals to said computer, said keyboard apparatus comprising:

a body portion having top and bottom sides, opposite front and rear sides spaced apart in a first direction, and opposite first and second end portions spaced apart in a second direction transverse to said first direction and graspable in the hands of a user of the keyboard apparatus;

a series of manually depressible keys supported on said top side and inset in said second direction from said first and second end portions;

a pointing device carried on said first end portion and operable by the user's hand grasping said first end portion;

a selection device carried on said second end portion and operable by the user's hand grasping said second end portion;

a pair of generally parallel recesses formed in said bottom side, extending in said first direction and spaced apart in said second direction, and configured to receive top side portions of a seated user's thighs; and electronic circuitry carried by said body portion and operative to receive input signals from said keys, said pointing device, and said selection device and responsively output corresponding remotely receivable infrared signals.

* * * * *